United States Patent [19]

Dick

[11] 4,271,456
[45] Jun. 2, 1981

[54] ADJUSTING APPARATUS FOR MOTOR VEHICLE HEADLAMPS

[75] Inventor: Heinz Dick, Odenthal, Fed. Rep. of Germany

[73] Assignee: Ford Motor Company, Dearborn, Mich.

[21] Appl. No.: 65,402

[22] Filed: Aug. 10, 1979

[30] Foreign Application Priority Data

Nov. 6, 1978 [DE] Fed. Rep. of Germany ....... 2847990

[51] Int. Cl.³ ............................................. B60Q 1/06
[52] U.S. Cl. ...................................... 362/66; 362/428
[58] Field of Search ........................... 362/66, 70, 428

[56] References Cited

U.S. PATENT DOCUMENTS 4,196,459  4/1980  Heinz ................................... 362/66

FOREIGN PATENT DOCUMENTS 7127862  9/1971  Fed. Rep. of Germany ............. 362/66
2633968  3/1977  Fed. Rep. of Germany ............. 362/66

*Primary Examiner*—Donald P. Walsh
*Attorney, Agent, or Firm*—John J. Roethel; Clifford L. Sadler

[57] ABSTRACT

This specification discloses an apparatus for adjusting a headlamp with reference to a vehicle body aperture. The headlamp is braced against a vehicle body through one fixed point and two adjusting devices. The adjusting devices include an adjusting screw coupled at one of its ends to the headlamp and engaged intermediate its ends in a threaded core of a retaining device rotatably journalled in a housing orifice in a vehicle body panel. The threaded bore for the adjusting screw is arranged eccentrically of the axis of rotation of the substantially cylindrical body of the retaining device.

3 Claims, 6 Drawing Figures

ADJUSTING APPARATUS FOR MOTOR VEHICLE HEADLAMPS

BACKGROUND OF THE INVENTION (1) Field of the Invention

This invention relates to an adjusting apparatus for motor vehicle headlamps.

(2) Prior Art

In known motor vehicle headlamp adjusting apparatus (taught in DE-GM No. 71 27 862) one of the retaining parts engaging the vehicle body panel supporting the headlamp assembly is provided with additional catches and handles to permit the adjustment of the headlamp. An adjustment screw provides simple and rapid correction of the light beam for normal service of the motor vehicle when the motor vehicle is fully loaded.

In other known prior art (DE-OS No. 26 33 968), one of the retaining parts engageable in the vehicle body sheet has a concentric sleeve which is adjustable through a handle in such a way that the adjustment of the headlamp by the adjusting screw for the normal service of the motor vehicle can be corrected rapidly and simply when the motor vehicle is fully loaded.

Thus, two known adjusting apparatuses disclose simple measures for correcting the inclination of the headlamps under varying loads of a motor vehicle.

Apart from the adjustability of the headlamp in conformity with technical illumination requirements, adjustability of the headlamp in order to align its external contour with reference to the vehicle body aperture housing has been found increasing desirable in recent times. These are some of the problems this invention overcomes.

SUMMARY OF THE INVENTION

It is the aim of the invention to construct an adjusting apparatus in such a way that an adjustability of the headlamp with reference to its vehicle body apparatus is achieved in a simple manner.

In accordance with an embodiment of this invention, in an adjusting apparatus for motor vehicle headlamps, a headlamp is braced against the vehicle body through one fixed point and two adjusting devices. The adjusting devices are constituted by an adjusting screw attaching a part of the headlamps at one end and housed in a screw threaded bore of a retaining device made of plastic material. The threaded bore receiving the adjusting screw is arranged eccentrically within a substantially cylindrical body of the retaining device which is rotatably positioned in a housing orifice in the vehicle body panel. Advantageously, if desired, the retaining device can be provided on its substantially cylindrical body with an external tooth system of undulating configuration through the intermediary of which it is anchorable in the respective rotary position with reference to a catch in the housing orifice. Alternatively, if desired, the retaining device can be provided with wing like handles and with a clamping flange having an arcuate slot, by which it is anchorable in the respective rotary position through a clamping screw.

Due to the fact that the threaded bore for the adjusting screw is arranged eccentrically within the substantially cylindrical body of the retaining device housed rotatably in a housing orifice in the vehicle body sheet, an adjustment laterally of the axis of rotation of the adjusting screw is made possible by a simple rotation of the retaining device about its cylindrical axis in the housing orifice. By this means an alignment of the headlamp with reference to its vehicle body aperture is rendered possible in simple manner.

The retaining device can be anchored in the respective rotary position by an external tooth system provided on its cylindrical engaging part and a corresponding catch in the housing aperture.

The retaining device may alternatively be provided with operating wings and with a surface exhibiting an arcuate slot, by which it can be anchored in the respective rotary position in the housing aperture by means of a clamping screw.

BRIEF DESCRIPTION OF THE DRAWINGS

The invention will be explained more fully with reference to two exemplary embodiments illustrated in the accompanying drawings, wherein:

FIG. 2 shows a section along the line II—II in FIG. 1;

DETAILED DESCRIPTION

Figure 1:
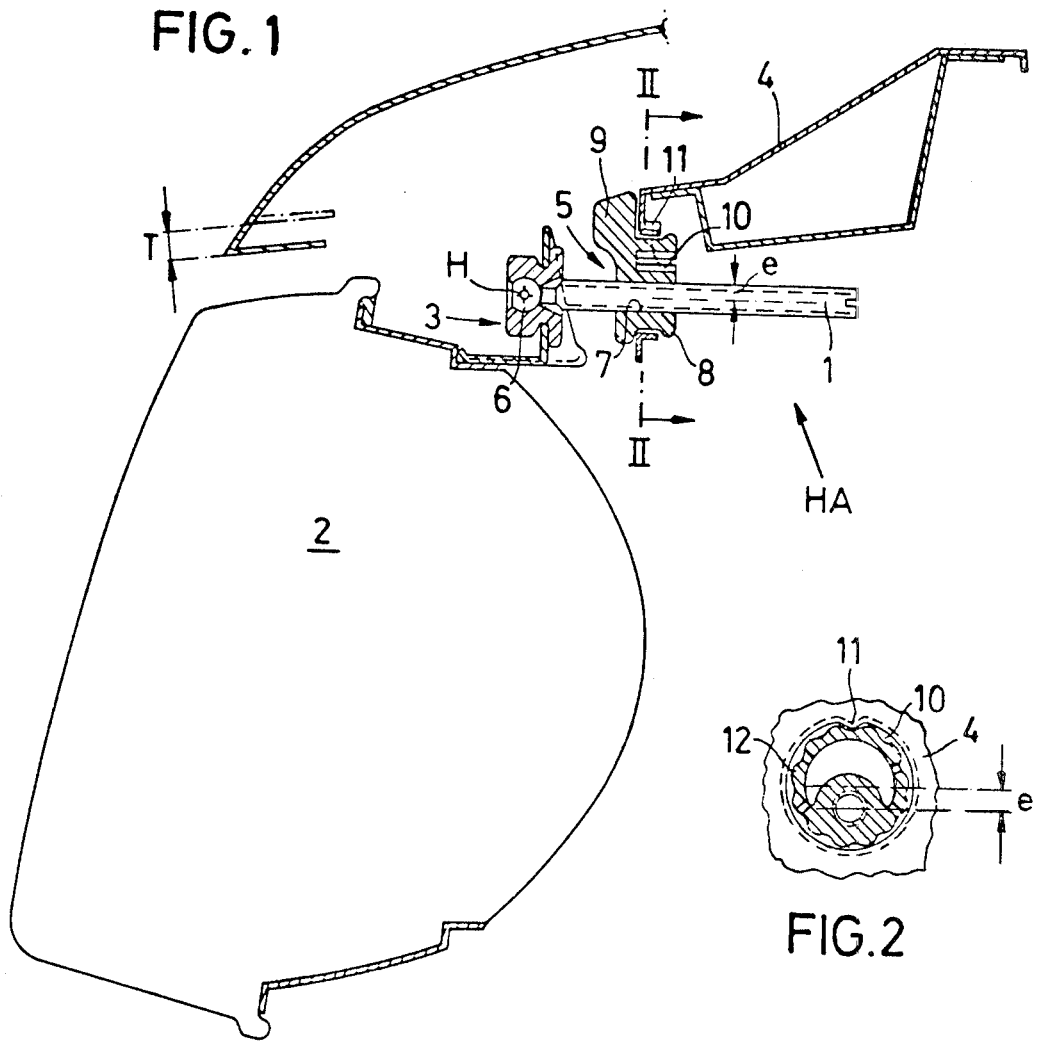
FIG. 1 shows a vertical section through the inner upper adjusting screw of a headlamp braced against the vehicle body through the intermediary of one fixed point and of two adjusting devices.
Figure 3:
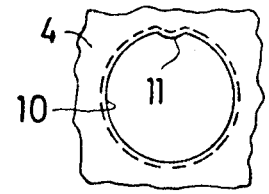
FIG. 3 shows the shape of the housing orifice in the vehicle body sheet for the retaining part according to FIG. 1.

An adjusting screw 1 shown in FIG. 1 together with a bearing part 3 fixed to a headlamp 2 and a retaining device 5 engaged in a vehicle body panel 4, constitutes an adjusting device HA for the adjustment of the direction of illumination of the headlamp.

Adjusting screw 1 is braced in bearing part 3 through the intermediary of a ballhead 6 and is housed in a screw threaded bore 7 in retaining part 5.

The horizontal optical axis H of headlamp 2 passes in this case through the outer upper fixed point, not shown, and ballhead 6. An adjustment of headlamp 2 above its horizontal axis H can be performed in conventional manner through the intermediary of an illumination range regulating device attacking it at the bottom in accordance with the state of load of the motor vehicle.

The adjustment of the direction of illumination of headlamp 2 can be performed by rotating adjustment screw 1 in the adjusting apparatus HA.

In the event of deviations T occurring at the vehicle body aperture and indicated by chain dotted lines, it is desirable to make an adjustment of the headlamp in the vertical direction possible in order to compensate such deviations.

Such an additional vertical adjustment is rendered possible by retaining device 5. Retaining device 5 consists of a hard elastic material and exhibits a substantially cylindrical body 8 and an operating handle 9. The cylindrical body 8 may be provided with slots in order to facilitate the insertion of the cylindrical body 8 into a housing aperture 10 in vehicle body panel 4. Housing aperture 10 is provided in this case with a catch 11 which cooperates with an undulating tooth system 12 on the external circumference of the cylindrical body 8 in order to anchor retaining device 5 in its respective rotary position.

As may be seen more particularly from FIG. 2, the eccentricity "e" with which threaded bore 7 is arranged in the cylindrical body 8 permits a vertical adjustment of adjusting screw 1 relative to the axis of rotation of the cylindrical body 8 by a maximum of twice "e". The lateral displacement of adjusting screw 1 which then occurs simultaneously can be made possible by an elongated ball socket in bearing part 3 to accommodate ballhead 6. It is however also possible to arrange bearing part 3 slidingly in an elongate aperture in the bracket on headlamp 2.

Figure 4:
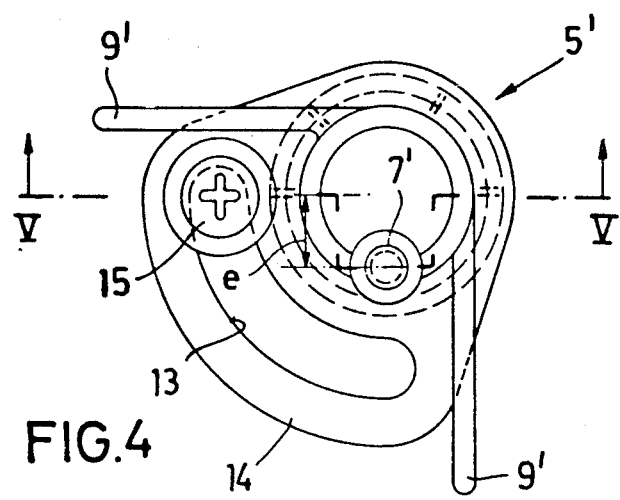
FIG. 4 shows an elevation of a further retaining part according to the invention.
Figure 5:
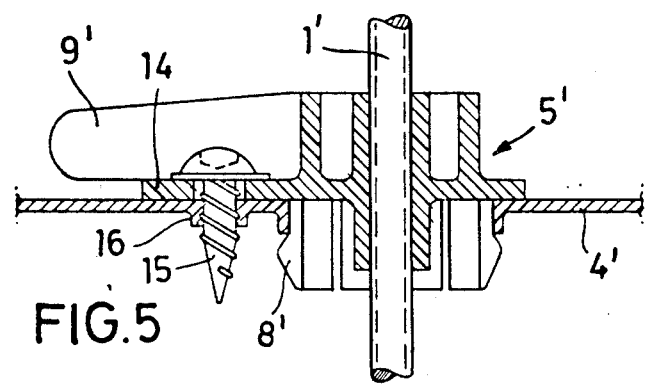
FIG. 5 shows a section made along the line V—V in FIG. 4.
Figure 6:
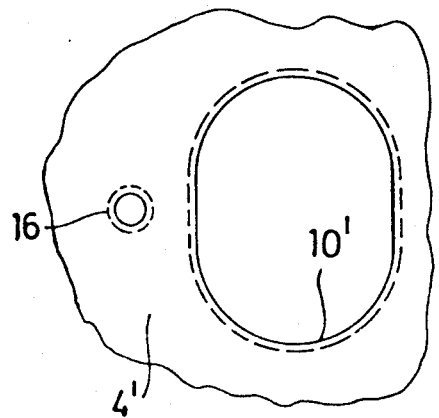
FIG. 6 shows the shape of the housing orifice in the vehicle body sheet for a retaining part according to FIG. 4.

FIG. 4 shows a bracket or retaining device 5', in which again a threaded bore 7' is arranged in order to accommodate an adjusting screw 1' eccentrically to the axis of rotation of a cylindrical body 8'. Retaining part 5' is provided here with two winglike handles 9', between which a clamping flange 14 exhibiting an arcuate slot 13 extends. A clamping screw 15 passes with play through the arcuate slot and engages in a bore 16 in a vehicle body panel 4'. Housing aperture 10' in vehicle body sheet 4' is of oval construction in this case in order to permit a displacement of retaining part 5' laterally.

In the case of this embodiment a longitudinally slidable mounting of adjusting screw 1' on the headlamp is unnecessary. The eccentricity "e" of threaded bore 7' with reference to the axis of rotation of cylindrical body 8' is chosen greater in this case so that a pivoting of retaining device 5' through 90° is already sufficient to compensate the deviations T which occur by adjustment.

Many other convenient embodiments and engaging means of a retaining part according to the invention are conceivable. All other variations which basically rely on the teachings through which this disclosure has advanced the art are properly considered within the scope of this invention.

I claim:

1. An adjusting apparatus for motor vehicle headlamps, wherein a headlamp is supported on a vehicle body through one fixed point and two adjusting devices, at least one of said adjusting devices including an adjusting screw coupled at one of its ends to the headlamp and threaded intermediate its ends in a threaded bore of a retaining device, the retaining device having a substantially cylindrical body that is rotatably journalled in a housing orifice in a vehicle body panel, the threaded bore receiving said adjusting screw having its axis eccentrically parallel to the axis of rotation of the cylindrical body of the retaining device, positioning means on the retaining device for rotating the latter to cause the adjusting screw to be swung laterally of the axis of rotation of the cylindrical body to adjust the vertical position of the headlamp, and coacting means on the retaining device and vehicle body panel engageable to hold the retaining device in adjusted position.

2. An adjusting apparatus as recited in claim 1, in which:

the coacting means comprises an external tooth system of undulating configuration on the substantially cylindrical body of the retaining device, the tooth system being engageable with a detent in the housing orifice to anchor the retaining device in a selected rotary position.

3. An adjusting apparatus as recited in claim 1, in which:

the retaining device is provided with wing-like handles and with a clamping flange having an arcuate slot therein, the retaining device being anchorable in a selected rotary position through a clamping screw.

* * * * *